United States Patent [19]

Schreiner et al.

[11] Patent Number: 5,350,630
[45] Date of Patent: Sep. 27, 1994

[54] REPULPABLE SECURING DEVICES

[75] Inventors: Steven A. Schreiner, Woodbury; Karen M. Albertson, Eagan; Mary L. Brown, St. Paul; Camille M. Hildebrandt, Stillwater; Lacy M. Hurlocker, White Bear Lake; Glenn C. Webster, Woodbury, all of Minn.

[73] Assignee: Minnesota Mining and Manufacturing Company, St. Paul, Minn.

[21] Appl. No.: 926,907

[22] Filed: Aug. 7, 1992

Related U.S. Application Data

[62] Division of Ser. No. 719,809, Jun. 24, 1991.

[51] Int. Cl.$^5$ .................. B32B 7/12; C08F 16/06
[52] U.S. Cl. .................... 428/343; 428/350; 428/355; 524/387; 524/388; 524/503; 526/329.5
[58] Field of Search ............. 428/343, 350, 355; 524/387, 388, 503; 526/329.5; 242/64

[56] References Cited

U.S. PATENT DOCUMENTS

| | | | |
|---|---|---|---|
| 3,330,409 | 7/1967 | Jorgensen | 206/83.5 |
| 3,560,464 | 2/1971 | Toyoshima | 525/60 |
| 3,616,165 | 10/1971 | Nishi | 428/294 |
| 3,652,371 | 3/1972 | Hirata | 428/58 |
| 3,865,770 | 2/1975 | Blake | 428/355 X |
| 3,892,905 | 7/1975 | Albert | 428/220 |
| 4,323,492 | 4/1982 | Zimmermann et al. | 524/388 |
| 4,328,269 | 5/1982 | Korpman | 428/354 X |
| 4,413,080 | 11/1983 | Blake | 524/187 |
| 4,414,258 | 11/1983 | Corbin, Sr. | 428/193 |
| 4,542,178 | 9/1985 | Zimmermann et al. | 524/388 |
| 4,544,693 | 10/1985 | Surgant | 524/375 |
| 4,569,960 | 2/1986 | Blake | 524/145 |
| 4,656,216 | 4/1987 | Muller et al. | 524/381 |
| 4,692,494 | 9/1987 | Sonenstein | 525/57 |
| 4,772,663 | 9/1988 | Marten et al. | 525/60 |
| 4,948,857 | 4/1990 | Marten | 526/329.5 |
| 4,992,501 | 2/1991 | Hanninen et al. | 428/355 X |
| 5,019,609 | 5/1991 | Toyonishi et al. | 524/503 X |
| 5,066,363 | 11/1991 | Lee et al. | 162/100 |
| 5,070,126 | 12/1991 | Toyonishi et al. | 524/503 X |
| 5,102,733 | 4/1992 | Zawadzki | 428/355 X |
| 5,125,995 | 6/1992 | D'Haese et al. | 428/355 X |
| 5,141,810 | 8/1992 | Ranade et al. | 428/350 |

FOREIGN PATENT DOCUMENTS

| | | |
|---|---|---|
| 0176316 | 3/1972 | European Pat. Off. . |
| 2483371 | 12/1981 | France . |
| 1-229805 | 9/1989 | Japan . |

OTHER PUBLICATIONS

Abstract of Japan Publication: 82102539.
Abstract of Japan Publication: 02075650.
Abstract of Japan Publication: 02153960.
Abstract of Japan Publication: 01033209.

*Primary Examiner*—Daniel Zirker
*Attorney, Agent, or Firm*—Gary L. Griswold; Walter N. Kirn; James V. Lilly

[57] ABSTRACT

The invention relates to repulpable securing devices for securing repulpable articles. The securing devices are preferably in the form of straps or tapes made from extruded sheets of polyvinylalcohol or rope from extruded fibers of polyvinylalcohol. The securing devices are wrapped around pulpable articles for example, bales of pulp sheets, to hold them securely bound during transit or storage. They may also be used in machine thread-up or turn-up operations or as a handle for repulpable articles. The securing devices have the combination of properties of high tensile strength and repulpability at cold and hot water repulp temperatures. The securing devices can be repulped along with repulpable bales. These devices replace conventional wire or plastic strap which must be separately removed and disposed of, for example, at landfill sites.

2 Claims, No Drawings

REPULPABLE SECURING DEVICES

This is a division of application Ser. No. 07/719,809 filed Jun. 24, 1991.

1. FIELD OF THE INVENTION

The invention relates to high tensile strength strapping (or securing) devices made from polyvinylalcohol.

2. DESCRIPTION OF THE PRIOR ART

The recycling of material has been receiving increased attention by communities and governments throughout the world. Appropriate landfill sites are becoming scarce. The damage to the environment caused by the dumping of unrecycled plastic and metal articles and chemical by-products is now well publicized. Plans are in place in many communities to recycle plastic bottles, aluminum cans, glass containers, newspaper, cardboard, and corrugated paper stock.

In the paper industry, many paper mills produce sheet dried pulp or flash dried pulp made from recycled paper or cardboard stock or from fresh wood chips. Sheet dried pulp is stacked, compressed into bales, wrapped and conventionally secured with wire or non-repulpable plastic strap wound around the bales. Pulp product from the flash dryer is compressed either directly into a bale of flash dried pulp or into smaller pieces which are then formed into a bale, wrapped and conventionally secured with wire or nonrepulpable plastic strap wound around the bales. These wires or straps must be removed before the pulp bales are conveyed to the pulper. Disposal of the wires or straps is a major concern to the mills. The wires pose a safety hazard to the workers because the wires, as they are cut for removal, spring apart and can cause serious cuts, lacerations, and eye injury. The wire is commonly disposed of in landfills. This causes damage to the environment and is a hindrance to workers and operating equipment at the landfill sites. If some of the wire or strap is inadvertently not removed from the pulp bale, it may get into the pulper and cause extensive damage. It is therefore desirable to find a repulpable strap material of requisite high tensile strength which would be effective in securing bales, or paper, cardboard or pulp to be conveyed to a pulper which typically may run at cold water temperature 13° C. (55° F.) or higher temperatures. The strap must also be flexible enough to be conformable so that it can be wrapped tightly around a pulp bale. The repulpable strap could be repulped along with the bale and thus pose no environmental problems.

Plastic material of polyvinylalcohol (PVA) has been known for many years and has been used to make water soluble bags for agricultural chemicals, laundry detergents and the like. The earliest polyvinylalcohol (PVA) was produced by casting a film of the PVA from an aqueous solution. These early processes had serious limitations. The viscosity of the PVA solution rises rapidly with increasing concentration of PVA. Casting processes permitted casting of only thin films. The higher concentration PVA solution required for thicker film produced material which could not be cast due to the high viscosity of such solutions. The following patents are representative of casting processes for producing thin PVA film: U.S. Pat. Nos. 4,692,494 (Sonenstein); 4,544,693 (Surgant); and 3,892,905 (Albert). These references also disclose the addition of stabilizers to the PVA solution. Such stabilizers as polyacrylic acid or polyvinylpyrrolidone made the PVA film more stable to an alkaline or acidic environment. The casting processes disclosed in the above mentioned patents typically enabled production of only very thin films of PVA, e.g. ½ mil (0.013 mm) to about 2 mils (0.051 mm) thickness after biaxial orientation (heat stretching).

It has thus become desirable to make PVA extrudable to overcome the limitations imposed by casting. This has been done by adding external plasticizer to the PVA resin or more recently by internal plasticization, i.e. by chemically altering the PVA polymer backbone. Early attempts to extrude PVA film and thus eliminate the limitations imposed by casting are reflected in U.S. Pat. No. 3,560,464 (Toyoshima). In U.S. Pat. No. 3,560,464 the PVA resin is modified by adding an external plasticizer, that is, a plasticizer that does not chemically become a part of the PVA polymer. Such external plasticizers are typically compounded with the PVA resin prior to extrusion. The plasticizer facilitates thermal extrusion of a PVA film, but it is generally difficult to achieve even concentration (homogeneity) of such plasticizer within the extruded film. U.S. Pat. Nos. 4,323,492 (Zimmermann) and 4,542,178 (Zimmermann) disclose a process of manufacture of externally plasticized PVA granules to facilitate thermal extrusion. U.S. Pat. No. 4,656,216 (Muller) discloses a PVA resin modified by both an external plasticizer and an internal plasticizer. As above mentioned the internal plasticizer alters the chemical backbone of the PVA polymer whereas the external plasticizer does not. These plasticizers were intended to facilitate thermal extrusion of the PVA resin.

The history of PVA extrusion processing also reveals the difficulty in producing an extruded PVA polymer that will remain soluble in both hot and cold water. The modified PVA resins disclosed in the above mentioned extrusion patents tend to become less soluble in cold water, e.g. 13° C. (55° F.) water, upon aging. After aging they tend to remain soluble only in hot water. The aforementioned modified PVA resins are also very difficult to extrude in single screw extruders, since those resins tend to degrade as they pass through such extruders.

In U.S. Pat. No. 4,772,663 (Marten) and continuation U.S. Pat. No. 4,948,857 (Marten) an internally plasticized PVA polymer is disclosed which involves a modification to the PVA polymer backbone. This modified PVA is extrudable in single-screw extruders, since it does not degrade as rapidly when subjected to high temperatures encountered in such extruders. The modified PVA disclosed in this reference has the additional advantage over prior art PVA resins in that the extruded PVA remains soluble in both hot and cold water, even after aging. Yet another important advantage of the modified PVA resin disclosed in this reference is that thicker films are obtainable, e.g. films 3 to 4 mils (0.076 mm to 0.10 mm) or higher thickness, even after orientation (heat stretching). The oriented thick films have higher tensile strength than most prior art extruded PVA film. The extruded PVA resin disclosed in this reference also remains both cold and hot water soluble even after the extruded film has been subjected to orientation.

In Japanese patent publication [89]-01-229805 the production of PVA filaments by dry wet spinning or gelation spinning the filaments in a coagulation solution is disclosed. The filaments are drawn at temperatures of between 180°–230° C. to produce PVA fibers of high tensile strength. The resulting fibers are not cold water soluble and can be used for high tensile rope and fishing net.

SUMMARY OF THE INVENTION

The invention is directed in one aspect to a high strength securing device, typically in the form of a sheet of varying width and/or thickness (e.g., a film, tape or strap) or a rope, that is repulpable in water at temperatures preferably between about 13° C. (55° F.) and repulp boiling temperature. However the preferred tape, strap or rope of the invention can be repulped in water at even lower temperatures for example between about 0° C. (32° F.) to about 13° C. (55° F.). More typically the preferred tape, strap, or rope of the invention is repulpable at temperatures between about 13° C. (55° F.) and 49° C. (120° F.). The tape, strap or rope of the invention can, however be repulped at, at least one temperature between about the freezing point of the pulp slurry, e.g. 0° C. (32° F.) and its boiling temperature, e.g. at about 100° C. (212° F.) at ambient (atmospheric) pressure. The tape, strap or rope is formed of polyvinyl alcohol which is extruded into sheets or filaments and oriented in the longitudinal direction.

The invention is also directed to a method of securing and releasably or permanently binding together pulpable stock particularly bales of pulp sheeting and bales of flash dried pulp. The invention can be used advantageously in securing and releasably or permanently binding other pulpable stock for example, recyclable paper, cardboard and corrugated stock destined to be repulped. The invention employs securing devices, preferably in the form of a strap or rope having the property that it is of high tensile strength, preferably having a break tensile strength of above $8.27 \times 10^7$ Newtons/m$^2$ (12,000 psi), preferably above $10.3 \times 10^7$ Newtons/m$^2$ (15,000 psi) and more preferably above 13.8 Newtons/m$^2$ (20,000 psi) and yet are repulpable. The term repulpable as used hereinafter refers to any material which readily breaks apart and disperses or dissolves in water during the pulping operation. The securing devices of the invention are repulpable in conventional pulpers which may operate under either cold or hot water conditions. The securing devices of the invention are repulpable in pulpers which can operate at pulp slurry temperatures between the freezing point and boiling point of the slurry (repulp boiling temperature). Such a pulper may be, for example the Black Clawson Hydrapulper which can operate at temperatures between about 0° C. (32° F.) and repulp boiling temperature, typically 100° C. (212° F.), at ambient (atmospheric) pressure. Such pulpers conventionally operate under atmospheric pressure using a large open vessel incorporating one or more bladed rotating elements that serve to both circulate the slurry and separate the fibers from each other. The term pulp slurry as used hereinafter shall refer to a suspension or dispersion of fibers, fillers, coatings, pigments and other solid materials in water, as used in the paper making process. The securing devices of the invention can be wrapped tightly around a pulp bale or the like of varying sizes and weights, to keep the bale from coming apart in transit and storage. Conventional wire or plastic strap typically used to bind such bales are thus replaced by the repulpable devices of the present invention. Since the securing devices herein described are repulpable, they can be repulped along with the pulp bales and thus eliminate the need for their separate removal and disposal in a landfill or by other means.

The securing devices of the present invention are formed of extruded polyvinylalcohol (PVA) resin and preferably subjected to orientation (heat stretching). The PVA can also be annealed (heat treated without stretching) to further improve the properties. Preferred resins for the subject application are selected from internally plasticized polyvinylalcohol resins. The polyvinylalcohol resins can be extruded and heat stretched into sheeting from which repulpable straps can be made, or they may be extruded and heat stretched into fiber filaments from which repulpable ropes can be made. The repulpable straps or ropes can be wound tightly around pulp bales in normal fashion. The ends of the straps or rope can be bound together by a variety of sealing or fastening means. Preferably such sealing means are also repulpable.

The repulpable straps can also be coated on one side with pressure sensitive adhesive to increase the holding strength of the strap as it is wound around a pulp bale. The securing devices of the invention can also be in the form of a tape useful in machine threadup or turn-up applications commonly encountered in paper mills.

DETAILED DESCRIPTION

Preferred embodiments of the invention are high strength water dispersible and repulpable securing devices, preferably in the form of tapes, straps or ropes which can be wrapped around and tightly secure bales of pulp, newspaper, cardboard and corrugated stock to be conveyed to a pulper. In preferred embodiments the repulpable tapes, straps or ropes of the invention are formed of polyvinylalcohol (PVA) which are repulpable in water at, at least one repulp temperature within the range between about 0° C. (32° F.) and 100° C. (212° F.) at ambient pressures or at, at least one repulp temperature between about 0° C. (32° F.) and the boiling point of the pulp slurry. (The boiling point of the pulp slurry can also be referred to as the repulp boiling temperature.)

The PVA strap, rope and tape of the invention are repulpable at repulp temperatures typically in the range between 13° C. (55° F.) and 49° C. (120° F.). The strap, rope and tape of the invention may typically also be repulpable at repulp temperatures in the range between 13° C. (55° F.) and 100° C. (212° F.). The preferred PVA strap, rope and tape of the invention may also typically be repulpable at repulp temperatures in the range between about 49° C. (120° F.) and 100° C. (212° F.). The term hot water repulpable shall refer hereinafter to any PVA which is repulpable at, at least one temperature that falls within the range between 49° C. (120° F.) and 100° C. (212° F.). The term cold water repulpable shall refer hereinafter to any PVA strap, rope or tape of the invention which is repulpable at, at least one temperature that falls within the range between 0° C. (32° F.) and 49° C. (120° F.). Any PVA strap, rope or tape if the invention which falls into the aforementioned definition of being cold water repulpable also has the property that it will be hot water repulpable in accordance with the above definition of hot water repulpability.

The temperature of water used in the repulping processes varies depending upon where the repulping plant is geographically located, whether city water or river water is used, and how much water is recycled. It is desirable to have a strap that is repulpable in water at ambient temperature so that external heating of the water is not required. A repulping process is typically run at temperatures between about 13° C. (55° F.) and 49° C. (120° F.). Initial batches using incoming water from a river or city water line will have temperatures around 4° to 16° C. (40° to 60° F.). If water is recycled from one batch to the next or from other areas of the paper making processing, the water temperatures in the batches start to increase and later batches can be run at temperatures as high at 49° C. (120° F.) or even higher.

The preferred PVA strap, rope or tape of the invention has a break tensile strength of above $8.27 \times 10^7$ Newtons/m$^2$ (12,000 psi) preferably above $10.3 \times 10^7$ Newtons/m$^2$ (15,000 psi) and more preferably above 13.8 Newtons/m$^2$ (20,000 psi). The preferred strap of the invention should also have absolute breaking strength (independent of width and thickness) of above 50 lb. (11 Newtons), more preferably above 100 lb. (22 Newtons), most preferably above 200 lb. (45 Newtons). The preferred strap advantageously exhibits low percent elongation at break point. Preferably the percent elongation at break should be below 50 percent.

Useful PVAs, e.g. cold water repulpable, have a degree of hydrolysis of between about 70% and about 95%, preferably between about 85 and 91%, and more preferably between about 87 and 89%. The degree of hydrolysis is the percent vinyl acetate units in the polymer that have hydrolyzed. The degree of crystallinity of the extruded and oriented tape can be from about 10% to about 45%. Preferably, PVA tape has a degree of crystallinity of from about 25% to about 45%.

Preferred PVA's in the practice of the invention are thermally stabilized, plasticized PVA's. The PVA's are plasticized to enhance their thermal stability and allow them to be extruded. The plasticizer can be added externally and compounded into a PVA formulation or it can be internal to the PVA polymer chain, i.e., the plasticizer is polymerized or grafted onto the PVA polymer backbone.

PVA's that can be externally plasticized include commercially available products such as "Mowiol" 26-88 and "Mowiol" 23-88 PVA resin available from Hoechst A. G. These "Mowiol" PVA resins have a degree of hydrolysis of 88%. "Mowiol" 26-88 PVA resin has a degree polymerization of 2100 and a molecular weight of about 103,000.

Plasticizers useful in externally plasticizing PVA are high boiling, water-soluble, organic compounds having hydroxyl groups. Examples of such compounds include glycerol, polyethylene glycols such as triethylene glycol and diethylene glycol, trimethylol propane, and combinations thereof. Water is also useful as a plasticizer. The amount of plasticizer to be added varies with the molecular weight of the PVA. In general, the plasticizer will be added in amounts of between about 5% to about 30%, and preferably between about 7% to about 25%. Lower molecular weight PVA's typically require less plasticizer than higher molecular weight PVAs. Other additives for compounding externally plasticized PVA's include processing aids (i.e. Mowilith DS resin from Hoechst A. G.), anti-blocking agents (i.e., stearic acid, hydrophobic silica), colorants, and the like.

Externally plasticized PVA's are compounded by slowly adding the organic plasticizer (and typically water) to the PVA powder or pellets under constant mixing until the plasticizer is incorporated into the PVA which occurs when the batch reaches a temperature of from about 82° C. (180° F.) to about 121° C. (250° F.). The lower the molecular weight of the PVA resin, the lower the maximum batch temperature required to incorporate the plasticizer. The batch is held at that temperature for about 5 to 6 minutes. The batch is then cooled to about between 71° C. (160° F.) and 93° C. (200° F.) at which time an antiblocking agent can be added. The batch is further cooled to about 66° C. (150° F.) at which time the PVA granulates can be removed from the mixer and extruded.

The compounding steps used to externally plasticize the PVA can be eliminated when an internally plasticized PVA is made except where it is desirable to add colorants, etc. Useful internally plasticized PVA's are commercially available. Such products include "Vinex" 2034 and "Vinex" 2025, both available from Air Products, Inc.

The Vinex trademark from Air Products represents a unique family of thermoplastic, water-soluble, polyvinylalcohol resins. Specifically, the "Vinex" 2000 series including "Vinex" 2034 and "Vinex" 2025 represent internally plasticized cold and hot water soluble polyvinylalcohol copolymer resins. Such internally plasticized vinylalcohol copolymers are described in U.S. Pat. No. 4,948,857 herein incorporated by reference. Such copolymers have the following general formula.

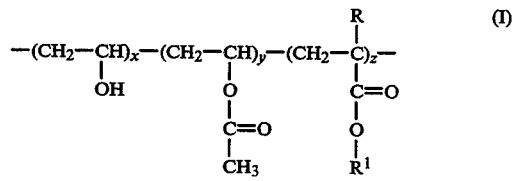

where
R is hydrogen or methyl;
R$^1$ is a C$_6$-C$_{18}$ hydrocarbyl group
y is 0 to 30 mole%;
z is 0.5 to 8 mole %; and
x is 70 to 99.5 mole %.

The process for preparing the copolymers comprises
(a) continuously feeding vinyl acetate monomer and an acrylate monomer to a reaction mixture in a reaction vessel,
(b) polymerizing the vinyl acetate and acrylate monomer to yield a copolymer in the reaction mixture,
(c) continuously withdrawing from the reaction vessel reaction mixture containing the copolymer, and
(d) hydrolyzing (alcoholizing) the acetate functionality of the copolymer to yield a vinyl alcohol copolymer.

Desirably, steps (a)–(c) are performed in such a manner as to attain a steady state condition in the reaction mixture.

As stated in U.S. Pat. No. 4,948,857 these copolymers are easy to prepare in existing polyvinylalcohol production equipment and offer a polymer having good thermoplastic and thermal stability properties. These copolymers retain the strength properties of polyvinylalcohol while also exhibiting increased flexibility. The acrylate monomer represented in the above formula by the groups

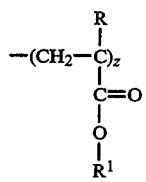

gives the copolymer its internal plasticization effect. The degree of polymerization of the copolymers can range from about 100 up to 2500, but is preferably between about 200 and 800. The degree of polymerization is defined as the ratio of molecular weight of the total polymer to the molecular weight of the unit as referenced in formula I. Other internally plasticized polyvinylalcohol copolymer resins and preparation of these resins are discussed in U.S. Pat. No. 4,772,663. "VINEX" 2034 resin has a melt index typically of about 8.0 g/10 mins. and a glass transition temperature of about 30° C. (86° F.). "VINEX" 2025 resin has a melt index typically of 24 g/10 mins and a glass transition temperature of about 29° C. (84° F.).

The plasticized PVA is typically extruded into a sheet and the sheet is oriented longitudinally to an orientation ratio of from about 2:1 to about 10:1 preferably from about 4:1 to 7:1. The orientation ratio is the ratio of the speed of last to first roller through which the film passes in the stretching process. The orientation process is typically done at temperatures of about 93° C. (200° F.) to about 1.21° C. (250° F.). The sheet can also be heat treated in an annealing process wherein after heat stretching, the sheet is in fact allowed to relax about 1% at an elevated temperature below the temperature at which the orientation process takes place.

The sheet can then be slit into desired strap or tape widths, or it can then be coated with a pressure sensitive adhesive. Typically the strap may have a width between about ¼ inch (0.64 cm) and 2 inch (5.1 cm) and thickness between 5 mil (0.13 mm) and 30 mil (0.76 mm). Although such straps are preferred, the straps are also intended to include wide sheeting. If the sheets or straps are coated with pressure sensitive adhesive, then it is preferred to employ repulpable pressure sensitive adhesive. A suitable pressure sensitive adhesive for the PVA strap of the invention for example, comprises an acrylate/acrylic acid copolymer, such as the pressure sensitive adhesives disclosed in U.S. Pat. Nos. 4,569,960 (Blake) and 4,413,080 (Blake), incorporated herein by reference. When a pressure sensitive adhesive is coated onto one side of the PVA sheet, the adhesive is usually protected with a release liner. Release liners are papers or films coated with silicones, fluorocarbons, polyolefins, or combinations thereof. Release liners are well known in the art and are commercially available from suppliers such as Akrosil and Daubert Coated Products, Inc.

Alternative embodiments of the invention include repulpable polyvinylalcohol straps, as above described, which also have a coating of adhesive, preferably pressure sensitive adhesive on one side of the strap. The adhesive coating is advantageously overlayed with a release liner which is removed prior to securing the strap around a pulp bale so that the adhesive coating may contact the bale. The adhesive coated strap can be wrapped around the bale several times so that each new layer of strap becomes adhesively bonded to the preceding layer. The adhesive coated strap may provide more holding strength than uncoated straps and may be desirable in securing large pulp bales or bales having an awkward configuration.

The straps, tapes, or ropes of the invention can be repulped along with pulp bales. Thus the invention eliminates the need to separately remove and separately dispose of the securing device as is required with conventional bale ties such as wire and plastic straps and tapes which are not water dispersible. The preferred polyvinylalcohol for the securing devices of the invention has a relatively high molecular weight and a polymer backbone chemistry that permits forming of sheeting or fibers by extrusion. The extrusion of the polyvinylalcohol, followed by orienting the extruded plastic as by heat stretching, produces a sheeting or fiber of high tensile strength. This combination of properties, namely extrudability into sheeting or fibers, cold and hot water repulpability, and high tensile strength, are important properties of the preferred securing devices of the invention. Repulping methods by which the securing devices of the invention can be suitably repulped include all conventional pulping methods including continuous and batch pulpers. Such pulpers typically operate under atmospheric pressure but it should be recognized that repulping operation at higher pressures could be employed. The polyvinyl alcohol tapes, straps and ropes of the invention could thus also be repulped in such repulpers which could operate at temperatures between freezing point and boiling point of the pulp slurry.

A polyvinylalcohol resin which can be advantageously used in forming the securing devices of the invention is a resin sold under the trademark "VINEX" available from Air Products and Chemical Company. We have determined that "VINEX" 2034 resin is a preferred resin which can be extruded into sheeting or fiber to make a high strength repulpable strap or rope, respectively, for securing pulp bales. We have determined that "VINEX" 2025 resin is also a preferred resin which can be extruded into fiber from which high strength, repulpable rope can be made for securing pulp bales. The straps or ropes formed from extrusion of such resins exhibit the desirable combination of properties above stated.

A high strength repulpable strap can be made by extruding and orienting (heat stretching) VINEX 2034 polyvinylalcohol resin into sheeting, typically of thickness between about 15 mils (0.38 mm) and 30 mils (0.76 mm) and cutting the sheeting into straps, typically between about ¼ inch to 1 inch (6.35 mm to 25.4 mm) in width, preferably about ½ inch (12.7 mm) in width. The straps can be wrapped tightly around pulp bales and fastened or sealed using mechanical brackets, ultrasonic welding, vibration welding, heat sealing, microwave sealing, radio frequency welding, dielectric sealing, hot knife, adhesive welding, including glue, hot melt and pressure sensitive adhesives, or by tying the strap ends into knots or by other sealing methods that can adequately hold the strap together. The preferred method of sealing the strap would be such that the entire strap is totally repulpable. The strap with a repulpable seal has the advantage that the seal would not need to be removed from the bale prior to conveying the pulp bale to a pulper, since the entire construction would disperse in the hydropulper and be disposed of in the wash water. The high strength strap could also be sealed with a magnetic non-repulpable closure. In this case the water dispersible strap would dissolve in the pulper and the magnetic closure would be separated from the pulp slurry by magnets located in the pulper.

Another application of the extruded PVA strap tape or rope of the invention is in combination with other repulpable articles such as use as a handle for repulpable containers including repulpable boxes, cartons and bags.

The tape of the invention is also useful in machine thread-up applications commonly encountered in paper mills to pull the paper stock through numerous rollers, idlers, and hot cans of a paper making machine or a paper converting machine. In machine thread-up, the paper stock in the machine is cut on a bias to the lengthwise direction of the paper stock, so that the initial portion of the paper stock in the machine has a tapered leading edge extending from one side of the paper stock. The paper is reinforced by applying a high strength tape coated with a pressure sensitive adhesive tape in a fan-like orientation so that strips of tape extend from the tapered leading edge towards the full width paper stock. The tapered leading edge is then attached to a leather strap used to pull the web around the various hot cans, rollers and idlers of the machine. Currently, filament tape is used for this application and the filament tape construction is not repulpable so the portion of the paper web covered with the filament tape must be removed manually and hauled to a landfill.

For machine thread-up applications, the tape is preferably coated with a water dispersible pressure sensitive adhesive such as those described in U.S. Pat. No. 4,569,960 (Blake). The tape should be thin enough so that it is not too stiff to travel around numerous rollers without popping off and/or delaminating the paper, but should be strong enough to pull the web through the machine. Thickness of the tapes can vary from about 4 mils (0.1 mm) to about 12 mils (0.3 mm), and are preferably from about 8 mils (0.2 mm) to about 10 mils (0.25 mm) in thickness. The breaking strength of the tape preferably is greater than about 43.7 newtons/cm (25 pounds per inch) width.

The present invention can also be used as a "turn-up" strap in paper mills. In this application, the "turn-up" strap is used to tear a web as it passes over a roller and causes simultaneous transfer of the web to an empty reel spool. The turn-up tape or strap should be of high tensile strength as well as be resilient enough to be wound tightly around the core to start the new roll of paper. Such a tape must also be thin enough to prevent surface impressions through excessive wraps of paper in the roll near the core. The "turn up" operation using conventional paper straps is described for example at col. 1, lines 24–35 in U.S. Pat. No. 4,414,258 (Corbin). This same operation can be employed using the repulpable strap of the present invention.

A high strength, repulpable rope can be made preferably by extruding and orienting (heating stretching) "VINEX" 2034 or "VINEX" 2025 polyvinylalcohol resin. The fibers can be formed, for example by melt spinning, using a single-screw extruder adapted with a conventional spinneret. The fibers can be twisted or braided to produce a repulpable rope of any desired thickness for use in securing pulp bales. The individual fibers can be of any suitable fineness (denier). Typically useful fiber can be between about 50 to 400 denier (gms per 9000 meters). The fibers have a fiber tenacity, i.e., break tensile strength of at least 0.8 grams per denier. Conventional techniques can be used to make the rope from the individual fibers. The rope can be of the twisted or braided variety, however, a twisted rope is preferred. A twisted rope can be made from the aforementioned polyvinylalcohol fiber for example, by first twisting groups of fibers called a tow and then twisting the tows or multiple groups of tows together to form the rope. Alternatively, two or more tows can be twisted in groups and these groups in turn can be twisted together to form the rope. The rope can be tightly wound around pulp bales and fastened or sealed using any of the above methods described with reference to the strap.

EXAMPLE 1

In Table I are reported the break strength, i.e. the tensile strength at break point, and repulp time for various repulpable twisted ropes made by extruding and melt spinning "VINEX" 2025 polyvinylalcohol resin. The rope, samples listed in Table I were formed by first twisting 30 fiber filaments of 168 denier (gms per 9000 meters) to form a twisted tow and then twisting the tows in the numbers indicated in Table I to produce the final rope. The individual fibers had a fiber tenacity, i.e., break tensile strength of at least 0.8 g/denier.

The fiber filaments for the ropes referenced in Table I were manufactured by melt spinning using conventional extrusion equipment adapted with conventional spinneret. The extruder was a Brabender general purpose single-screw extruder having a 30 hole spinneret attached at the extruder outlet end. The extruder barrel had a length/diameter ratio of 25:1. The extruder screw was a general purpose screw having a channel-depth ratio of 3:1. (The channel depth ratio is the ratio of the screw channel depth in the feed section to the channel depth in the outlet (metering) section.) The "VINEX" 2025 resin was subjected to a temperature gradient of between 190° C. and 200° C. (374° F. and 392° F.) and pressures of about 1500 psi (10,340 newton/m$^2$) as measured at the end of the extruder. The filaments emanating from the extruder were passed around a take up roll, then around a first group of drawing rolls, then a first heated platen, then a second drawing roll, then a second heated platen, then a third drawing roll, then a third heated platen, then a fourth drawing roll and finally was passed to a level winder. The roll speeds were as follows: take up roll, 12 m/min (41 ft/min); first drawing rolls, 15 m/min (51 ft/min); second drawing roll, 50 m/min (164 ft/min); third drawing roll, 51 m/min (167 ft/min); fourth drawing roll, 51 m/min (168 ft/min). The heated platen temperatures were as follows: first heated platen, 183° C. (361° F.); second heated platen, 200° C. (392° F.); and third heated platen, 145° to 170° C. (293° to 338° F.). These combination of roller speeds and heated platen temperature produced a draw orientation i.e., heat stretching, of the fiber filaments at an orientation ratio of about 3.3:1. (The orientation ratio reported is the ratio of speeds of the last to first drawing roller employed in the stretching process.) The draw orientation for the fiber filament may advantageously be between 1.2:1 to 7:1. The heat orientation of the fiber filaments results in significant increase in the tenacity and break strength (tensile strength at break point) of the fiber.

The break strength, psi, was measured by placing each rope sample in a conventional INSTRON tensile tester Model No. 1102 manufactured by INSTRON Corp. The rope was held in place in the INSTRON tester using a pair of gripping (Capstan) jaws. The tester was activated whereupon the rope was pulled longitudinally until the break point was reached and the tensile strength at break point was recorded.

The repulp time of each rope sample was determined by introducing a given amount, (0.48 g) of rope sample into a MARK III C/TMP Disintegrator manufactured by Mavis Engineering L.T.D. To the disintegrator was added 24 gms of 200 lb/ream (3000 ft$^2$/ream) of utility white blotting stock from INTERCITY Paper Co., St. Paul, Minn. Water (2000 mL at 72° F.) was then added to the disintegrator whereupon the disintegrator was activated. The disintegrator above referenced has a three bladed propeller which rapidly disintegrates the stock. The stock was disintegrated for a period of time reported as the repulp time in Table I. (The disintegrator was itself not heated.) The disintegrator was run for a set period of time whereupon the disintegrated slurry was made into handsheets of about 0.127 mm to 0.254 mm (5 to 10 mil) thickness using an 8 inch×8 inch William Sheet mold. The handsheets were visually inspected for discernible particles or strands of unrepulped polyvinylalcohol material. If no such particles were discernible with the naked eye when holding the handsheets to the light, then the rope was said to be adequately repulped. The repulp times reported in the Tables therefore are conservative, since the exact repulp time would be less than the reported times.

(350° F.), 193° C. (380° F.), 199° C. (390° F.) and 193° C. (380° F.) respectively. The pressures along the extruder inlet, midpoint and outlet were 500 psi (3.4×10$^6$ N/m$^2$), 1200 psi (8.2×10$^6$ N/m$^2$), and 1600 psi (11×10$^6$ N/m$^2$), respectively. The extruder die was 5 inches (13 cm) wide with a 100 mil (2.54 mm) gap opening. The film emanating from the extruder was cast onto a stainless steel chill roll maintained at 24° C. (75° F.). The film was stretched on four heated rolls at 104° C. (220° F.). The film was stretched in the machine direction, i.e. longitudinally with an orientation ratio of about 5:1. (The orientation ratio is the ratio of speeds of last to first drawing roller through which the film passes in the stretching process.) The film was chilled again on a stainless steel roll maintained at 24° C. (75° F.). The film was annealed around an annealing roll at 93° C. (200° F.) whereupon it was allowed to relax about 1% of its length. The film passed through a shear slitter and was slit into 1.27 cm (½ inch) straps which were wound onto a core.

The break strengths and repulp times for the straps reported in Table II were conducted in generally the same manner as described with respect to the twisted ropes (Table I). However, the break strength of the straps was determined using an INSTRON tensile tester Model No. 1122 manufactured by the INSTRON Co.

TABLE I

BREAK STRENGTH AND REPULP TIMES FOR "VINEX" 2025 PVA TWISTED ROPE CONSTRUCTION

| TWISTED ROPE NO. OF TOWS[1] | ROPE DIAMETER | BREAK STRENGTH NEWTONS (POUNDS) | REPULP TIME MINUTES[2] |
|---|---|---|---|
| 2 | 1.9 mm | 214 (48) | 15 |
| 4 | 2.3 mm | 400 (90) | 15 |
| 6 | 2.7 mm | 600 (135) | 15 |
| 8 | 3.1 mm | 672 (151) | 15 |

Notes:
[1]Each tow was composed of 30 filaments. Each filament had a fineness of 168 denier. (Denier is the weight of a filament in gms per 9000 meters).
[2]Water temperature at 22° C. (72° F.) (initial condition).

EXAMPLE 2

In Table II are reported the break strength and repulp times for various repulpable straps made by extruding and orienting (heat stretching) "VINEX" 2034 polyvinylalcohol resin. The straps were made on a Prodex Model No. 1.75 PM 75 single screw extruder having a 32:1 length/diameter ratio. The extruder screw had a channel depth ratio of 2:1. The temperatures at the four equally spaced zones along the extruder were 177° C.

Each strap sample to be tested was held in place in the INSTRON unit using rubber jaws. When the INSTRON unit was activated the strap sample was pulled longitudinally until the break point was reach and recorded.

TABLE II

BREAK STRENGTH AND REPULP TIMES FOR PVA "VINEX" 2034 STRAPS SUBJECTED TO LONGITUDINAL ORIENTATION

| SAMPLE | WIDTH INCHES | THICKNESS MIL | BREAK STRENGTH POUNDS | BREAK TENSILE STRENGTH PSI | % ELONG | YOUNG'S MODULUS PSI | REPULP TIME MINUTES |
|---|---|---|---|---|---|---|---|
| 1 | ½ | 22 | 350 | 32,000 | 45 | 210,000 | 15 |
| 2 | ½ | 28 | 358 | 25,000 | 23 | 98,000 | 20 |
| 3 | ½ | 12 | 167 | 29,000 | 27 | 194,000 | 7 |
| 4 | ½ | 16 | 180 | 23,000 | 35 | 140,000 | 7 |

METRIC UNIT CONVERSION

| SAMPLE | WIDTH cm | THICKNESS mm | BREAK STRENGTH NEWTONS | TENSILE STRENGTH NEWTON/m$^2$ | % ELONG | YOUNG'S MODULUS NEWTON/m$^2$ | REPULP TIME MINUTES |
|---|---|---|---|---|---|---|---|
| 1 | 1.27 | 0.56 | 1557 | 2.2 × 10$^8$ | 45 | 1.4 × 10$^9$ | 15 |
| 2 | 1.27 | 0.71 | 1592 | 1.7 × 10$^8$ | 23 | 6.8 × 10$^8$ | 20 |
| 3 | 1.27 | 0.30 | 743 | 2.0 × 10$^8$ | 27 | 1.3 × 10$^9$ | 7 |
| 4 | 1.27 | 0.41 | 801 | 1.6 × 10$^8$ | 35 | 9.7 × 10$^8$ | 7 |

In a separate experiment employing the above described extrusion process, the effect on tensile strength of longitudinal orientation of a relatively thick sheet of PVA extruded from "VINEX" 2034, was examined. A sheet of extruded PVA was made using "VINEX" 2034 resin using the above described extrusion process set forth in Example 2. This sheet was extruded to a thickness of 19.5 mil (0.5 mm) without subsequent orientation and the break strength was measured as $4.7 \times 10^7$ N/m$^2$ (6800 psi). This break strength was inadequate to permit use of the sheet as a strap for securing pulp bales.

In another example using "VINEX" 2034 resin using the above described extrusion process as in Example 2, the sheet was extruded to a thickness of about 50 mils (1.27 mm) and then heat stretched in the machine direction to an orientation of 5:1. The resulting sheet had a thickness of about 15 mil (0.38 mm) and a break tensile strength of $2 \times 10^8$ N/m$^2$ (29,100 psi) which is satisfactory for use in securing pulp bales.

EXAMPLE 3

Fibers, from extruded VINEX 2025 were prepared by the method described in Example 1. A rope was formed of 8 twisted tows, wherein each tow contained 30 fiber filaments of 168 denier thickness. The ropes were tightly wound around a 159 kg (350 lb) rectangular bale of Westvaco flash dried pulp. Two ropes spaced equidistant were wound around the bale in one direction and two additional ropes were wound around the bale in a cross direction, i.e., perpendicular to the first pair of ropes. Each of the four ropes was twice wound around the bale. The bale was then dropped from an elevation of 2 ft (0.6 m) and then from an elevation of 17 ft (5.2 m). (The 17 ft elevation is the maximum lift height on conventional fork lift trucks.) In each case the ropes held the bale intact. The same test was repeated with the 159 kg (350 lb) bale secured with only two ropes (each twice wound) wound in the same direction over the bale. The bale when dropped from an elevation of 5.2 m (17 ft) came apart and the test failed. The ropes, however, remained unbroken.

EXAMPLE 4

Straps of ½ inch (1.27 cm) width and 20 mils (0.51 mm) thickness were made by extruding VINEX 2034 resin in the manner described in Example 2. These straps were wrapped around 204 kg (450 lb) bales of dried sheet pulp and the bales dropped from various elevations up to 17 ft (5.2 m). The straps were found to hold the bales intact in all cases.

Straps as described above were also tested for handling, storage, and transit under conditions that would be typical in the handling of pulp bales in a paper mill. The straps were wrapped around 24 substantially rectangular 159 kg (350 lb) bales of flash dried pulp that were about 38 cm (15 inches) high such that the straps criss crossed with one strap securing the bale in the lengthwise direction and the other strap securing the bale in the crosswise direction. The straps were tightened with a ratchet and secured with a metal clip. The bales were then randomly stacked using a fork lift truck amongst bales secured with wire straps in a rail car. The bales were stacked 7 bales high. The bales were held in a closed rail car at ambient temperatures during summer months with temperature variations of between 16°-38° C. (60°-100° F.) and relative humidity variations of from about 60 to 100%. The rail car was moved around in the rail yard periodically to simulate in transit conditions. After a period of 6 weeks, the bales were then unloaded by fork lift truck. All of the bales remained intact during this handling process.

EXAMPLE 5

This example involves the use of repulpable straps made from externally plasticized PVA.

A batch of plasticized PVA was prepared by mixing 1000 parts by weight Mowiol 26-88 (available from Hoechst A. G.), 180 parts glycerin, 50 parts of deionized water, and 25 parts of Mowilith DS (Available from Hoechst A. G.) in a Welex Mixer (Model No. TGAK8 available from Papenmeir Maschinenbau). The batch was mixed continuously until it reached a temperature of 104° C. (220° F.) and held at that temperature for 6 minutes. The batch was then cooled (via cooling water to the mixer jacket) to a temperature of 93° C. (200° F.) and 6.0 parts of a hydrophobic silica (Aerosil 972 available from DeGussa), 2.5 parts of stearic acid, and 0.3 parts of Patent Blue Dye were added to the mixer. The batch was cooled to a temperature of 65° C. (150° F.) and the resulting granulated product was extruded on a 4.45 cm (1.75 inch) Prodex extruder having an L/D ratio of 24:1 and a 3:1 compression screw. The 14 inch (36 cm) die orifice was set at 16-17 mils (0.41-0.43 mm). Set point temperature on the extruder were zone 1 at 182° C. (360° F.), zone 2 at 185° C. (365° F.), zone 3 at 188° C. (370° F.), and zone 4 at 191° C. (375° F.). The die temperature was set at 185° C. (365° F.). The compounded PVA extruded well and the sheet was oriented as described above at various orientation ratios shown in Table III. The oriented sheets were cut into straps and tested for thickness, tensile strength, and elongation and the results are reported in Table III. When these straps were oriented, for example, at orientation ratios of 3:1 to 4:1 the straps had a satisfactory break tensile strength of above $1.38 \times 10^8$ Newtons/m$^2$ (20,000 psi) at normal thickness of about 4 mils (0.10 mm) as may be seen from Table III. These straps were repulpable at repulp temperatures between about 10° C. (50° F.) and repulp boiling temperature.

TABLE III

| | BREAK STRENGTH FOR PVA ("MOWIOL" 26-88) SHEETS SUBJECTED TO LONGITUDINAL ORIENTATION | | | | | |
|---|---|---|---|---|---|---|
| ORIENTATION RATIO | THICKNESS mm (MILS) | BREAK TENSILE STRENGTH | | BREAK STRENGTH[1] | | PERCENT ELONGATION AT BREAK |
| | | N/m$^2$ | (PSI) | N/m | (LBS/IN) | |
| unoriented | 0.23 (9.0) | $7.58 \times 10^7$ | (11,000) | $1.73 \times 10^4$ | (99) | 222 |
| 3:1 | 0.11 (4.3) | $1.74 \times 10^8$ | (25,250) | $1.91 \times 10^4$ | (109) | 33 |
| 4:1 | 0.10 (3.8) | $1.98 \times 10^8$ | (28,700) | $1.91 \times 10^4$ | (109) | 46 |

Notes:
[1] Break tensile strength reported as force per unit width for the sample at indicated thickness.

EXAMPLE 6

This example also involves the use of repulpable straps made from externally plasticized PVA.

A batch of PVA was plasticized by mixing together 1500 parts of Mowiol 26-88 PVA resin, 300 parts of triethylene glycol, and 37.5 parts of Mowilith DS in a Welex mixer. The mixture reached a temperature of 99° C. (210° F.) and the batch of resin was held at the temperature for 5 minutes. To the mixture was then added 7.5 parts of Aerosil R972 silica and 15 parts of titanium dioxide. The batch was mixed until it had cooled to a temperature reached 65.6° C. (150° F.). The granules were extruded as described in Example 5 and the extrudate was formed into 10.5 mil (0.27 mm) and 3.9 mil (0.099 mm) film sheets. The sheets were cut into straps and tested for tensile and elongation as reported in Table IV. The strap at nominal thickness of 0.099 mm (3.9 mil) and an orientation ratio of about 3.5:1 had a satisfactory break tensile strength of above $1.38 \times 10^8$ Newtons/m² (20,000 psi). This strap was repulpable at repulp temperatures between about (10° C.) 50° F. and repulp boiling temperature.

TABLE IV

| | BREAK STRENGTH FOR MOWIOL 26-88 PVA SHEETS SUBJECTED TO LONGITUDINAL ORIENTATION | | | | | |
|---|---|---|---|---|---|---|
| ORIENTATION RATIO | THICKNESS mm (MILS) | BREAK TENSILE STRENGTH | | BREAK STRENGTH[1] | | PERCENT ELONGATION AT BREAK |
| | | N/m² | (PSI) | N/M | (LBS/IN) | |
| unoriented | 0.27 (10.5) | $6.55 \times 10^7$ | (9,500) | $2.1 \times 10^4$ | (120) | 333 |
| 3.5:1 | 0.099 (3.9) | $1.7 \times 10^8$ | (24,600) | $1.68 \times 10^4$ | (96) | 24 |

Notes:
[1] Break tensile strength reported as force per unit width for the sample at thickness indicated.

It should be appreciated that repulpable securing devices other than strap or rope, per se, can be employed using the resins and methods described herein. The securing devices of the invention are also not intended to be limited to application to securing pulp bales. They can desirably be used in securing other articles whenever repulpability is a requirement. The invention, therefore is not intended to be limited to the specific embodiments described herein, but rather is defined by the claims and equivalents thereof.

What is claimed is:

1. A repulpable pressure sensitive adhesive tape, comprising:
   a) a backing of a thermally extruded, longitudinally oriented sheet of plasticized polyvinyl alcohol, said extruded polyvinyl alcohol having a degree of hydrolysis between about 70 and 95% and a degree of crystallinity between about 10 and 45%, and having the property of being repulpable at, at least one temperature between about 0° C. (32° F.) and repulp boiling temperatures, and
   b) a repulpable pressure sensitive adhesive on at least one surface of said backing,
   wherein said tape has a break tensile strength of at least $8.27 \times 10^7$ Newtons/m² (12,000 psi).

2. A repulpable pressure sensitive adhesive tape according to claim 1 wherein said polyvinyl alcohol has the repeating unit represented by the formula:

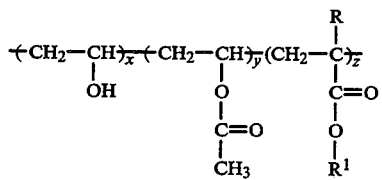

wherein
R is selected from the group consisting of hydrogen and methyl;
$R^1$ is a $C_6$-$C_{18}$ hydrocarbyl group;
y is 0 to 30 mole %;
z is 0.5 to 8 mole %; and
x is 70 to 99.5 mole %.

* * * * *

UNITED STATES PATENT AND TRADEMARK OFFICE
CERTIFICATE OF CORRECTION

PATENT NO. : 5,350,630

DATED : September 27, 1994

INVENTOR(S) : Schreiner et al.

It is certified that error appears in the above-identified patent and that said Letters Patent is hereby corrected as shown below:

| | |
|---|---|
| Col. 4, line 44 | "The strap, rope" should be --The PVA strap, rope-- |
| Col. 7, line 30 | "about 1.21°C" should be --about 121°C-- |
| Col. 14, line 20 | "TGAK8" should be --TGAHK8-- |

Signed and Sealed this

Twenty-seventh Day of December, 1994

Attest:

BRUCE LEHMAN

Attesting Officer     Commissioner of Patents and Trademarks